(12) United States Patent
Kallivretaki et al.

(10) Patent No.: US 12,134,202 B2
(45) Date of Patent: Nov. 5, 2024

(54) COUPLING, FABRICATION THEREOF, AND HANDLE AND RAZOR COMPRISING SAME

(71) Applicant: BIC VIOLEX S.A., Anoixi (GR)

(72) Inventors: Argyro Kallivretaki, Anoixi (GR); Ioannis Bozikis, Anoixi (GR)

(73) Assignee: BIC Violex Single Member S.A., Anoixi (GR)

( * ) Notice: Subject to any disclaimer, the term of this patent is extended or adjusted under 35 U.S.C. 154(b) by 607 days.

(21) Appl. No.: 17/428,826

(22) PCT Filed: Mar. 24, 2020

(86) PCT No.: PCT/EP2020/058238
§ 371 (c)(1),
(2) Date: Aug. 5, 2021

(87) PCT Pub. No.: WO2020/200933
PCT Pub. Date: Oct. 8, 2020

(65) Prior Publication Data
US 2022/0118636 A1  Apr. 21, 2022

(30) Foreign Application Priority Data

Mar. 29, 2019 (EP) ..................................... 19166235

(51) Int. Cl.
*B26B 21/52* (2006.01)
*F16D 1/10* (2006.01)
*F16D 3/10* (2006.01)

(52) U.S. Cl.
CPC .............. *B26B 21/521* (2013.01); *F16D 1/10* (2013.01); *F16D 3/10* (2013.01)

(58) Field of Classification Search
CPC . B26B 21/4012; B26B 21/225; B26B 21/521; F16D 1/10; F16D 3/10
See application file for complete search history.

(56) References Cited

U.S. PATENT DOCUMENTS 3,182,345 A * 5/1965 Smith .................... A61C 17/32
403/375
4,993,154 A * 2/1991 Radcliffe .............. B26B 21/521
30/32

(Continued)

FOREIGN PATENT DOCUMENTS

CN      108235699 A      6/2018
EP       2583800 A1      4/2013

(Continued)

OTHER PUBLICATIONS

KR-101887119-B1 English translation; Aug. 9, 2018; Kim Dong, B26B21/4012.*

(Continued)

*Primary Examiner* — Daniel J Wiley
(74) *Attorney, Agent, or Firm* — Bookoff McAndrews, PLLC (57) ABSTRACT

Coupling for a razor, comprising a first component, a second component rotatable relative thereto about a rotational axis extending therebetween, and a rotation limit, a male part thereof extending along the rotational axis into a female part thereof. The male and female parts are shaped to define one or more rotational stops to the rotation of one of the first and second components about the rotational axis relative to the other. A resilient protrusion of the second component, receivable in a recess of the first component, bends elastically in response to a force applied during shaving that rotates the one component about the rotational axis relative to the other component, and biases them towards a neutral position once the force is stopped. Fabrication of the coupling. Razor and handle comprising the coupling.

11 Claims, 5 Drawing Sheets

(56) References Cited

U.S. PATENT DOCUMENTS

| | | | |
|---|---|---|---|
| 5,029,391 | A | 7/1991 | Althaus et al. |
| 5,033,152 | A | 7/1991 | Althaus |
| 5,107,590 | A * | 4/1992 | Burout, III ............... B25G 1/10 30/526 |
| 5,956,851 | A * | 9/1999 | Apprille, Jr. ........ B26B 21/4062 30/526 |
| 9,522,472 | B2 | 12/2016 | Leicht et al. |
| 9,764,487 | B2 | 9/2017 | Robertson et al. |
| 10,022,208 | B2 * | 7/2018 | Yoshida ............... A46B 5/0095 |
| 2011/0173821 | A1 * | 7/2011 | Hage ...................... B26B 21/10 30/526 |
| 2015/0217466 | A1 * | 8/2015 | Leicht ................. B26B 21/4075 30/50 |
| 2016/0263757 | A1 * | 9/2016 | Vandervelde ....... B26B 21/4012 |
| 2018/0200899 | A1 * | 7/2018 | Eagleton ............... B26B 21/528 |
| 2019/0176355 | A1 * | 6/2019 | Mazarakis ............ B26B 21/225 |
| 2019/0193293 | A1 * | 6/2019 | Peach ................... B26B 21/222 |
| 2019/0202076 | A1 * | 7/2019 | Park ................... B26B 21/4025 |
| 2021/0339416 | A1 * | 11/2021 | Kopelas ................ B26B 21/521 |

FOREIGN PATENT DOCUMENTS

| | | | | |
|---|---|---|---|---|
| EP | 2511057 | B1 | 4/2014 | |
| EP | 3486048 | A2 | 5/2019 | |
| JP | H11300065 | A | 11/1999 | |
| KR | 101887119 | B1 * | 8/2018 | ......... B26B 21/4012 |
| KR | 101894213 | B1 | 9/2018 | |
| WO | 2011131945 | A1 | 10/2011 | |
| WO | 2018007844 | A1 | 1/2018 | |

OTHER PUBLICATIONS

International Search Report and Written Opinion in International Application No. PCT/EP2020/058238, dated May 19, 2020 (8 pages).

Search Report issued in corresponding publication No. CN113453855A (application No. 2020800154094), mailed Feb. 16, 2023.

* cited by examiner

COUPLING, FABRICATION THEREOF, AND HANDLE AND RAZOR COMPRISING SAME

This application is a National Stage Application of International Application No. PCT/EP2020/058238, filed on 24 Mar. 2020, now published as WO/2020/200933, and which claims priority to European Patent Application No. EP 19166235.2, filed on 29 Mar. 2019, the entire contents of which are incorporated herein by reference.

FIELD

The present disclosure relates to the field of skincare, and in particular to shaving. More specifically, the present disclosure relates to a handheld skincare device, a handle therefor, and a coupling usable therewith.

BACKGROUND

When shaving specific body areas, as the back region of the legs, the shaver head (blade unit) may lose the contact with the skin. A user attempting to achieve the contact may rotate the razor around his/her forearm, having a sense of discomfort. Suboptimal ergonomy can have repercussions not only in terms of the comfort of use of a skincare device, but also for safety. For example, discomfort can increase or even be a symptom of fatigue and may increase the risk of potentially ineffective or even unsafe maneuvering of the skincare device.

In an attempt to address this problem, certain shavers have introduced mechanisms to provide a head which is repositionable relative to the handle (see U.S. Pat. No. 9,764,487B2), or which is flexibly coupled to the handle (see U.S. Pat. No. 9,522,472B2, WO2011131945A1 & EP2511057B1) to provide motion around the shaver handle axis.

SUMMARY

It has been found that these known couplings increase the complexity of the shaver, leading to increased costs and/or undesirable geometric constraints.

According to embodiments of the present disclosure, a coupling may be provided. The coupling may be for a razor. The coupling comprises a first component, a second component rotatable relative thereto about a rotational axis extending therebetween, and a rotation limit. The second component comprises a resilient protrusion. The first component comprises a recess in which the protrusion is receivable. The recess is configured to bend the protrusion received in the recess elastically in response to a force applied during shaving thereby rotating one of the first component and the second component about the rotational axis relative to the other. The rotation limit comprises a female part and a male part receivable therein such that the male part extends along the rotational axis into the female part. The male and female parts are shaped to define one or more rotational stops to the rotation of the one of the first and second components about the rotational axis relative to the other. The protrusion is configured to bias the first or second components back towards a neutral position once the force applied is stopped. The protrusion is monolithically formed with the second component.

According to embodiments of the present disclosure, the protrusion may extend substantially perpendicularly to the rotational axis.

According to embodiments of the present disclosure, the axis of bending may be oblique or parallel or coincident to the rotational axis.

According to embodiments of the present disclosure the recess may be monolithically formed on the first component.

According to embodiments of the present disclosure, a first rotational stop may be defined by a first surface portion of the female part that may be configured to contact a first surface portion of the male part received in the female part when the coupling reaches a first rotational position.

According to embodiments of the present disclosure, a second rotational stop may be defined by a second surface portion of the female part that may be configured to contact a second surface portion of the male part received in the female part when the coupling reaches a second rotational position.

According to embodiments of the present disclosure, a cross-section of the male part, taken perpendicularly to the rotational axis, may comprise a first circular arc with a first central angle. A cross-section of the female part, taken perpendicular to the rotational axis, may comprise a second circular arc, substantially concentric to the first circular arc, with a second central angle that is greater than the first central angle.

According to embodiments of the present disclosure, the female and male parts of the rotation limit may be monolithically formed respectively with the first and second components, or vice versa.

According to embodiments of the present disclosure, the coupling may comprise an axial translation limit. The axial translation limit may be configured to limit translation of the first component relative to the second component along the rotational axis.

According to embodiments of the present disclosure, a radial projection of the axial translation limit may be slidingly receivable in a circumferential groove of the axial translation limit.

According to embodiments of the present disclosure, the circumferential groove may be monolithically formed with one of the first and second components. The radial projection may be monolithically formed with the other of the first and second components.

According to embodiments of the present disclosure, the coupling may comprise an axial centering system. The axial centering system may be configured to limit movement of the first and second components relative to one another along or about axes perpendicular to the rotational axis.

According to embodiments of the present disclosure, a substantially cylindrical shaft of the axial centering system may be monolithically formed with the second component. A substantially cylindrical hole of the axial centering system may be monolithically formed with the first component. The shaft may be receivable within hole and rotatable in the hole about the rotational axis. The hole and the shaft received in the hole may both be substantially coaxial with the rotational axis.

According to embodiments of the present disclosure, the coupling may consist of the first component and the second component, the rotation and axial translation limits and the axial centering system being monolithically formed with the first and second components.

According to embodiments of the present disclosure, the coupling may consist of the first component and the second component, the rotation limit and the axial centering system being monolithically formed with the first and second components.

According to embodiments of the present disclosure, the male part may be monolithically formed with the second component. The female part may be monolithically formed with the first component.

A coupling as described herein may allow rotation of the first and second components relative to one another about the rotational axis within a given range, while biasing the first and second components towards a particular rotational position.

The present disclosure also presents a method of assembling a coupling. The coupling may be a coupling as described herein. The method comprises axially aligning a first component and a second component of the coupling so as to be substantially coaxial to a rotational axis, rotationally aligning a resilient protrusion on the second component with a recess of the first component, translationally aligning the first component and the second component so that the protrusion is inserted into the recess, rotationally aligning a male part of a rotation limit of the coupling with a female part of the rotation limit, and translationally aligning the male part and female part so that the male part is inserted into the female part and extends into the female part along the rotational axis.

According to embodiments of the present disclosure, the method may comprise one or more of the following: inserting a radial projection of a axial translation limit of the coupling into a circumferential groove of the axial translation limit, inserting a shaft of an axial centering system of the coupling into a hole of the axial centering system.

According to embodiments of the present disclosure, a handle may be provided. The handle may be for a handheld skincare device. The handle comprises a grip portion. The handle comprises a connection portion. The connection portion is configured to attach to a skincare head. The handle comprises a coupling. The coupling may be a coupling as described herein. The coupling is configured to couple the grip and connection portions together such that the grip portion and the connection portion extend longitudinally along the rotational axis.

According to embodiments of the present disclosure, the first component may be coupled to one of the connection and grip portions and may extend therewith to a first side of the handle. The other of the connection and grip portions may extend to a second side of the handle. The rotational axis of the coupling may extend between the first and second sides of the handle.

According to embodiments of the present disclosure, the first component of the coupling may be coupled to the connection portion. The second component of the coupling may be coupled to the grip portion.

According to embodiments of the present disclosure, the handle may consist of the connection and grip portions. The grip portion may be monolithically formed with the first component, and the connection portion may be monolithically formed with the second component, or vice versa.

A handle as described herein may allow rotation of a tool connected thereto relative to a hand holding the handle with a substantially constant grip thereon.

According to embodiments of the present disclosure, a razor may be provided. The razor may comprise a skincare head. The skincare head may be or include a shave head. The razor comprises a coupling as described herein or a handle as described herein.

A razor as described herein may allow rotation of the blades within a given range relative to a hand holding the razor with a substantially constant grip thereon.

BRIEF DESCRIPTION OF THE DRAWINGS

The disclosure may be more completely understood in consideration of the following detailed description of aspects of the disclosure in connection with the accompanying drawings, in which.

While aspects of the disclosure are amenable to various modifications and alternative forms, specifics thereof have been shown by way of example in the drawings and will be described in detail. It should be understood, however, that the intention is not to limit aspects of the disclosure to the particular embodiment(s) described. On the contrary, the intention of this disclosure is to cover all modifications, equivalents, and alternatives falling within the scope of the disclosure.

DETAILED DESCRIPTION

As used in this disclosure and the appended claims, the singular forms "a", "an", and "the" include plural referents unless the content clearly dictates otherwise. As used in this disclosure and the appended claims, the term "or" is generally employed in its sense including "and/or" unless the content clearly dictates otherwise.

The following detailed description should be read with reference to the drawings. The detailed description and the drawings, which are not necessarily to scale, depict illustrative aspects and are not intended to limit the scope of the disclosure. The illustrative aspects depicted are intended only as exemplary.

According to embodiments of the present disclosure, the protrusion is configured to remain received in the recess during rotation between the neutral rotational position and the first and/or second rotational position(s), and to bias the first and second components towards the neutral rotational position when elastically bent by the recess.

Figure 1:
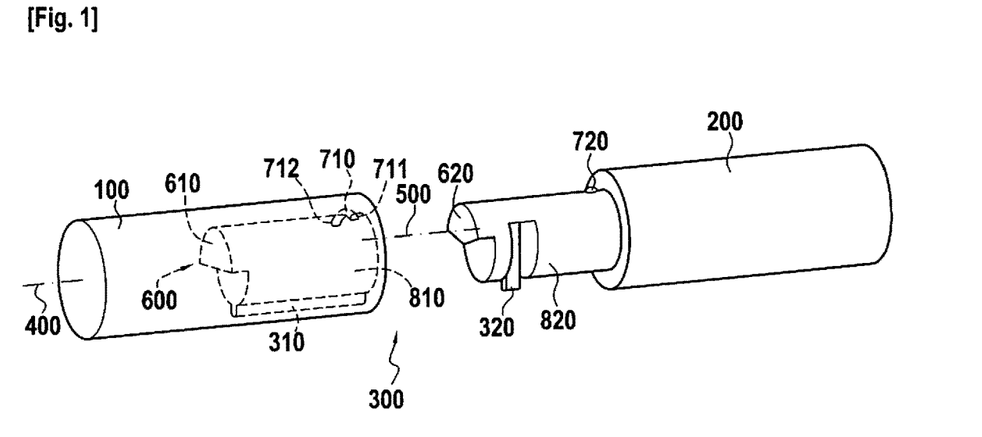
FIG. 1 shows a disassembled coupling.
Figure 6A:
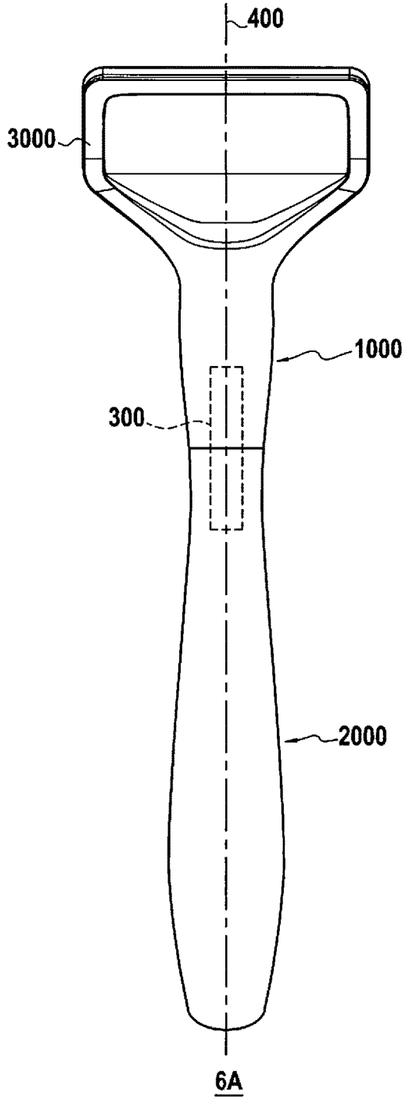
FIGS. 6A & 6B show a razor.
Figure 6B:
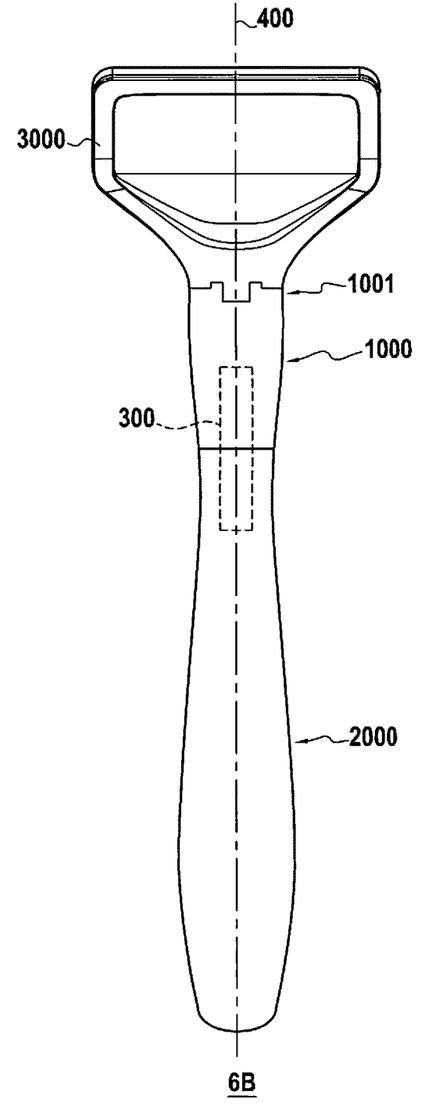

FIG. 1 shows a coupling 300. As seen in FIGS. 6A-6B, the coupling 300 may be for a razor.

As seen in FIG. 1, the coupling 300 may comprise a first component 100. As a non-limiting example, the first component 100 may comprise one or more of the following materials: M-ABS, MBS, Polycarbonate, PET, Copolyester, Polypropylene, ABS, HIPS, PC/ABS, PC/PET, Polyacetal, PPE/PS, PLA compound, Polystyrene (GPPS), Polyethylene, Pre- Post-consumer recycled plastic, which may be particularly well-suited for molding. Additionally or alternatively, the first component may comprise thermoplastic filaments (e.g. ABS, PLA, nylon, PETG), thermoplastic powders (e.g. polyamide 12, polyamide 11), thermoset photopolymer resins (e.g. standard, ABS-like, PP-like, rubber-like, high temperature) or thermoset liquid resins (e.g. standard, ABS-like, PP-like, rubber-like, high temperature), which may be particularly well-suited for additive manufacturing processes.

The coupling 300 may comprise a second component 200. As a non-limiting example, the second component 200 may comprise any of the materials listed above for the first component 100. As a non-limiting example, the second component 200 may comprise one or more of the following materials: M-ABS, MBS, polycarbonate, PET, copolyester, polypropylene, ABS, HIPS, PC/ABS, PC/PET, polyacetal, PPE/PS, thermoplastic filaments (e.g. ABS, Nylon), thermoplastic powders (e.g. polyamide 12, polyamide 11), thermoset photopolymer resins (e.g. ABS-like, PP-like), or thermoset liquid resins (e.g. ABS-like, PP-like).

Figure 2:
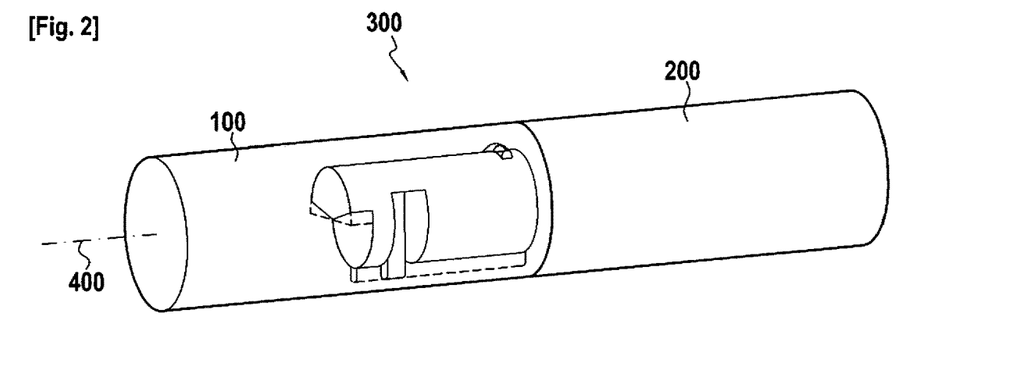
FIG. 2 shows a coupling.

The second component 200 may be rotatable relative to the first component 100 about a rotational axis 400. As seen in FIG. 2, the rotational axis 400 may extend between the first 100 and second 200 components.

As seen in FIG. 1, the coupling 300 may comprise a rotation limit 600.

The rotation limit 600 may define rotational stops at a first rotational position and a second rotational position of the coupling 300. For the purposes of the present disclosure, the term "rotational position of the coupling" may be understood to refer to a rotational position of the second component 200 relative to the first component 100. The first 100 and second 200 components may be rotatable relative to one another between the first and second rotational positions. The rotation limit 600 may interfere with rotation beyond the first and second rotational positions of the coupling 300 from a rotational position that is intermediate thereto. As a non-limiting example, the rotation limit 600 may permit rotation of the coupling 300 over a range of 5° to 20° (clockwise and anticlockwise relative to the neutral position), more specifically 10°-15°.

The second component 200 may comprise a resilient protrusion 320. The first component 100 may comprise a recess 310.

Figure 4A:
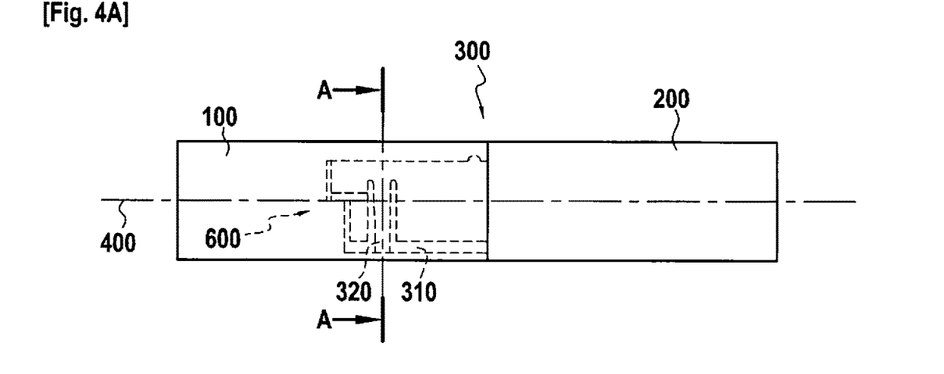
FIG. 4A shows a side view of a coupling.
Figure 4B:
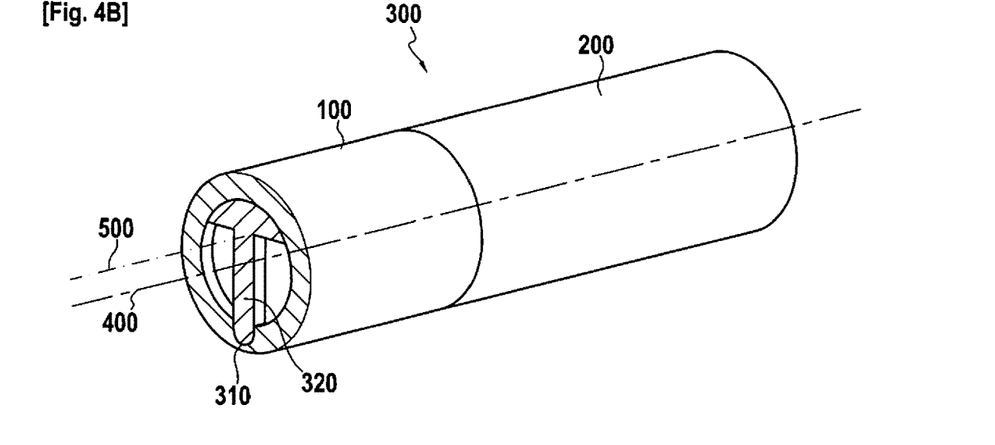
FIGS. 4B & 4C show sectional views along line A-A (visible in FIG. 4A)
Figure 4C:
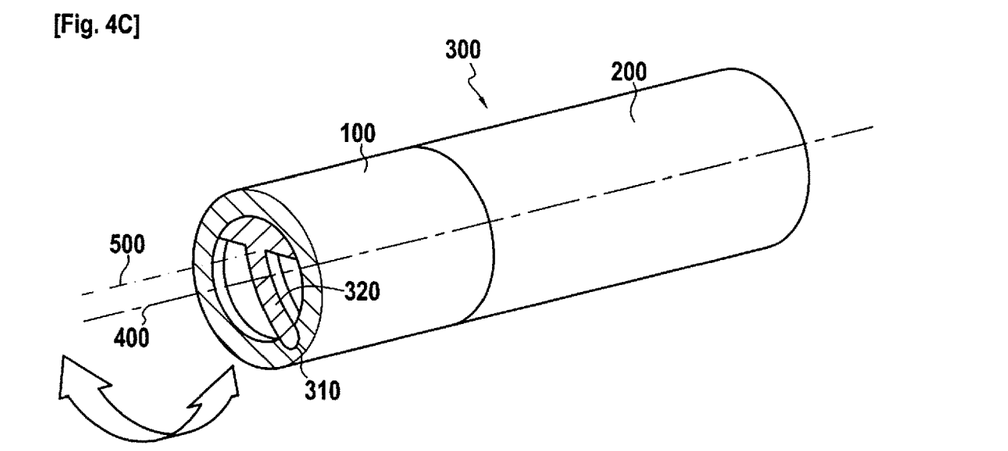

As seen in FIG. 2, the recess 310 may be configured to receive the protrusion 320. As seen in FIGS. 4A-4C, the protrusion 320 may be configured to be bendable by the recess 310 when it is received therein. The bending may be elastic.

As seen in FIG. 1, the recess 310 may be configured to bend the protrusion 320 about an axis of bending 500 in response to a force applied during shaving thereby rotating e.g. the first component 100 about the rotational axis relative to the second component 200 (or vice versa). In other words, the force may cause one of the first and second components to rotate about the rotational axis relative to the other, bending the protrusion. The axis of bending 500 may be oblique or parallel or coincident to the rotational axis. In this way, it may be possible for the protrusion 320 to extend in a direction perpendicular to the rotational axis 400.

According to some embodiments of the present disclosure, the protrusion may pivot around the axis of bending.

The protrusion 320 may be configured to bias the first 100 and second 200 components towards a neutral rotational position of the coupling 300 when the force is stopped. This may be because the protrusion 320 is elastically bent by the recess 310 when the force is applied. In this way, the protrusion 320 may confer rotational flexibility to the coupling 300 and/or may serve as a return mechanism to return the coupling to a neutral position.

For example, the recess may apply between 2.5 and 17 N on the protrusion when the coupling reaches the first and/or second rotational positions.

Figure 3:
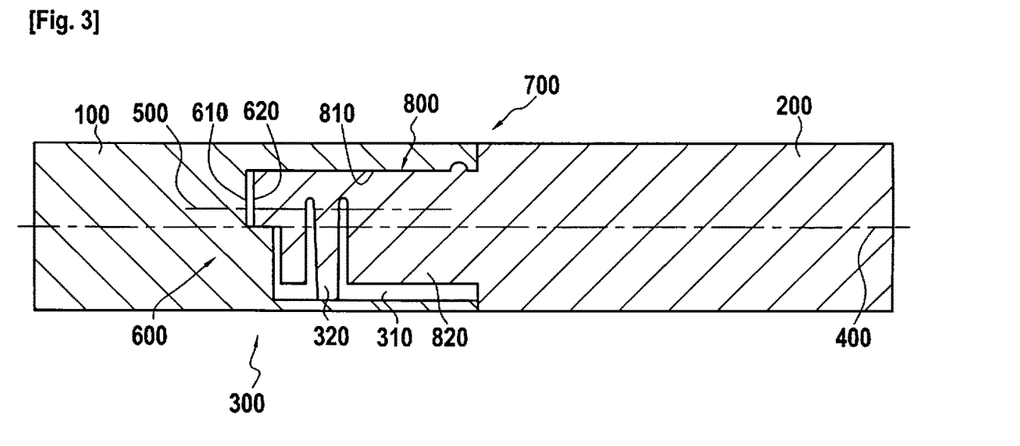
FIG. 3 shows a sectional view of a coupling.

As seen in FIG. 3, for example, the protrusion 320 may be at least as long, and possibly longer, in a direction perpendicular to the rotational axis 400 as a distance from the rotational axis 400 to an extremity of the protrusion 320 that is insertable into the recess 310. For example, the protrusion may have a length of 5-15 mm, more specifically 7.8 mm. The protrusion may have a width (as measured along the rotational axis) of about 2 mm, for example. The thickness of the protrusion may be 1.2 mm, for example. When, for example, a protrusion of these dimensions presents a Young's modulus of approximately 2370 MPa (for example as when made of ABS), the protrusion may be deflectable by about 15° under a force of approximately 5.3 N.

The protrusion 320 may be configured to remain received in the recess 310 during rotation of the first 100 and second 200 components relative to each other.

According to some embodiments, the neutral rotational position may remain fixed relative to the first and second rotational positions during rotation of the coupling 300 therebetween.

The recess 310 may be monolithically formed on the first component 100, and/or the protrusion 320 may be monolithically formed with the second component 200. In this way, it may be possible to reduce or avoid mechanical play between the recess 310 and the first component 100, and/or between the protrusion 320 and the second component.

Alternatively, one or more of the recess 310 and the protrusion 320 may be provided as a removable insert of the respective component. In this way, it may be possible to modify the mechanical behavior of the coupling 300 by swapping out the insert(s). For example, an insert (or multiple inserts) may be swapped out for a replacement having different geometric or material properties.

The first component 100 may be made of a same material as the second component 200. Providing a same material to each of the first 100 and second 200 components may allow for simultaneous fabrication of the first 100 and second 200 components, for example as in unitary construction. Moreover, and without regard for unitary construction, providing the same material may allow the first and second components to be molded simultaneously.

Alternatively, the first component 100 may comprise a different material from the second component 200, or vice versa. Providing the first component 100 with a different material from the second component 200 may allow for reductions in cost. For example, a lower-cost material and/or a recycled material may be provided for the component comprising the recess and a higher-cost material may be provide for the component comprising the protrusion, since the mechanical properties of the component comprising the recess may be less influential on the functionality of the coupling than are the mechanical properties of the component comprising the protrusion. For example, the second component 200 may be made of PC-ABS (a relatively high-cost material which has a relatively high flexural strength) and the first component 100 may be made of Polystyrene (a relatively low-cost material which has a lower flexural strength than PC-ABS). Thus, manufacturing costs may be kept low while product lifetime and safety are kept high.

The recess 310 may be made of the same material as the first component 100. In this way, it may be possible to form the recess 310 simultaneously with the remainder of the first component 100. For example, the first component and the recess may be formed during single-shot injection molding. Other modes of fabrication of the first component 100 will be discussed later.

Alternatively, the recess 310 may comprise a different material from the first component 100, or vice versa.

The protrusion 320 may be made of the same material as the second component 200. In this way, it may be possible to form the protrusion 320 simultaneously with the remainder of the second component 200. For example, the second component and protrusion may be formed during single-shot injection molding. Other modes of fabrication of the second component will be discussed later.

Alternatively, the protrusion 320 may comprise a different material from the second component 200, or vice versa. Providing the protrusion 320 with a different material from the remainder of the second component 200 may allow rigidity of the coupling 300 to be increased along or about axes perpendicular to the rotational axis 400, while nevertheless ensuring flexibility and/or resilience in rotation about the rotational axis 400. For example, the protrusion 320 may comprise a material that has a higher flexural strength than the remainder of the second material 200. Providing the protrusion with a higher flexural strength may increase the lifetime of the protrusion without significantly increasing material costs of the coupling. The flexural strength of the material may influence the safety of a structure subjected in bending deformation, and it is available by the material supplier. For example, the protrusion 320 may be made of PC-ABS and the remainder of the second component 200 may be made of Polystyrene. Thus, manufacturing costs for the second component 200 may be kept low while component lifetime and safety are kept high.

Thus, the second component 200 may be provided with a high safety of structure and increased lifetime with low material costs.

The protrusion 320 may be made of a same material as the recess 310. In this way, fabrication of the coupling 300 may be kept relatively simple.

Alternatively, the protrusion 320 may comprise a different material from the recess 310, or vice versa. For example, the material of the recess 310 may have a lower flexural strength than the material of the protrusion 320. In this way, material costs of the coupling can be reduced.

As seen in FIGS. 1 & 3, the coupling 300 may comprise an axial translation limit 700. The axial translation limit may allow the relative rotation between the two components, while precluding longitudinal translation therebetween (notwithstanding mechanical play that may be present within the axial translation limit). Thus, an easy and quick assembly method may be achieved, without the need for extra components.

As seen in FIG. 3, the coupling 300 may comprise an axial centering system 800. The axial centering system 800 may be configured to limit movement of the first 100 and second 200 components relative to one another along or about axes perpendicular to the rotational axis 400. In this way, it may be possible to maintain the first 100 and second 200 components aligned along the rotational axis 400, notwithstanding any mechanical play that may exist within the axial centering system 800.

As seen in FIGS. 4A & 4B, the coupling 300 may be configured to enter the neutral rotational position when the force applied is stopped substantially as explained in connection with FIG. 1.

Without regard for the arrangement of the neutral rotational position relative to the first and second rotational positions, the protrusion 320 may, as seen in FIG. 4B, be substantially unbent when the coupling 300 is in the neutral rotational position, or otherwise subject to reduced bending, or, for example, less than when the coupling 300 is in the first or second rotational position. In this way, it may be possible to provide a stable equilibrium position at the neutral position.

As seen in FIG. 1, the rotation limit 600 may comprise a female part 610. As a non-limiting example, the female part 610 may be comprised by the first component 100.

The rotation limit 600 may comprise a male part 620. As a non-limiting example, the male part 620 may be comprised by the second component 200 when the female part 610 is comprised by the first component, or vice-versa. The female part 610 may be configured to receive the male part 620. The male part 620 may extend along the rotational axis 400 into the female part 610 when it is received therein.

The male 620 and female 610 parts may cooperate by contacting one another when the coupling 300 is in one or more of the first and second rotational positions.

Figure 5A:
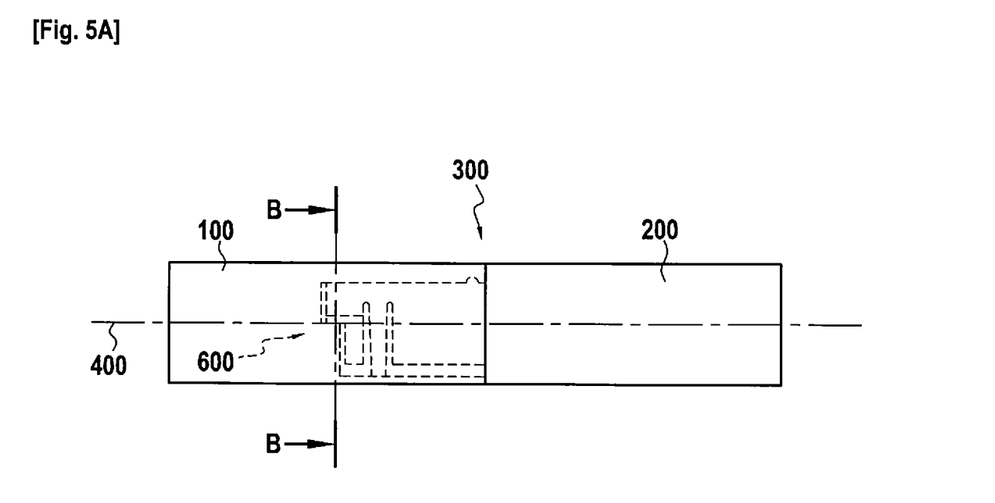
FIG. 5A shows a side view of a coupling.
Figure 5B:
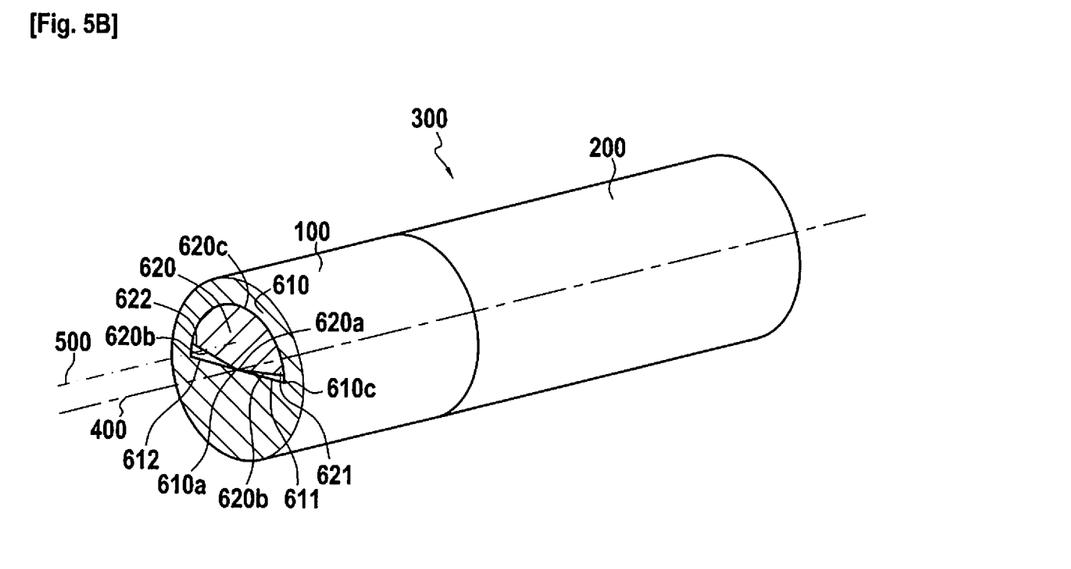
FIG. 5B shows a sectional view along line B-B (visible in FIG. 5A)

For example, as seen in FIGS. 5A & 5B, a first surface portion 611 of the female part 610 may be configured to contact a first surface portion 621 of the male part 620 when the male part 620 is received in the female part 610 and the coupling 300 is in the first rotational position. This contact may interfere with an ability of the coupling 300 to undergo a first rotation, in which the coupling 300 is rotated from a position intermediate the first and second rotational positions, beyond the first rotational position.

Additionally or alternatively, a second surface portion 612 of the female part 610 may be configured to contact a second surface portion 622 of the male part 620 when the male part 620 is received in the female part 610 and the coupling 300 is in the second rotational position. This contact may interfere with an ability of the coupling 300 to undergo a second rotation, in which the coupling 300 is rotated from the position intermediate the first and second rotational positions, beyond the second rotational position.

As a nonlimiting example, such cooperation between the male 620 and female 610 parts may be obtainable by providing the male 620 and female 610 parts with geometries that allow for rotation of the male part 620 relative to the female part 610 in which it is received.

For example, as seen in FIG. 5B, a cross-section taken along line B-B (represented in FIG. 5A) of the female part 610, taken perpendicular to the rotational axis 400, may comprise a first circular arc 610c with a first central angle 610a. When the male part 620 is received in the female part 610, a cross-section of the male part 620, taken perpendicular to the rotational axis 400, may comprise a second circular arc 620c, substantially concentric to the first circular arc 610c, with a second central angle 620a, which may be greater than the first central angle 610a.

As a non-limiting example, the female part 610 and the component 100, 200 comprised thereby may be produced with the same material. Such a configuration may be particularly well-suited for single-shot injection molding, for example, and/or for monolithic formation of the female part on the component.

As a non-limiting example, the male part 620 and the component 100, 200 comprised thereby may be produced with the same material. Such a configuration may be particularly well-suited for single-shot injection molding, for example, and/or for monolithic formation of the male part on the component.

Alternatively, the female 610 and/or male 620 part may comprise a different material from the component on which it is provided. By providing a different material for the male 620 and/or female 610 part(s) from the component(s) on which it is/they are provided, it may be possible to encourage one or more characteristics of an interaction between the female 610 and male 620 parts when the male part 620 is received in the female part 610, and to substantially localize the occurrence of these characteristics to a vicinity of the male 620 and female 610 parts.

The female part 610 may be made of a same material as the male part 620. In this way, fabrication of the coupling 300 may be kept relatively simple.

Alternatively, the female part 610 may comprise a different material from the male part 620, or vice versa.

As seen in FIG. 1, the axial translation limit 700 may comprise a radial projection 720. The axial translation limit 700 may comprise a circumferential groove 710.

As seen in FIG. 2, the groove 710 may be configured to receive the projection 720. The projection 720 may be configured to slide within the groove 710 when received therein.

Movement of the 100 and second 200 components relative to one another along the rotational axis 400, and the axial separation that may result therefrom, may be limitable to a clearance, for example a sliding clearance, between the groove 710 and the projection 720. As a non-limiting example, the groove 710 may have a depth of between 0.45 and 0.85, specifically 0.65 mm, as measured perpendicular to the rotational axis.

As seen in FIG. 1, the groove 710 may be provided on the first component 100. The projection 720 may be provided on the second component 200.

The groove 710 and projection 720 may even be provided on the first 100 and second 200 components respectively, or vice versa.

The groove 710 and/or projection 720 may be monolithically formed on the component(s) on which they are/it is provided. In this way, it may be possible to avoid introducing mechanical play between the groove 710 or projection 720 and the component on which it is provided.

The groove 710 and/or the projection 720 may be made of a same material as the component(s) on which it is/they are provided. In this way, it may be possible to keep fabrication of the axial translation limit 700 relatively simple. For example, provision of the same material may allow the groove 710 or projection 720 to be fabricated substantially simultaneously with the component on which it is provided. Additionally or alternatively, when the groove 710 and/or the projection 720 is/are monolithically formed with the component on which it is/they are provided, provision of the same material may facilitate monolithic formation.

Alternatively, the groove 710 and/or the projection 720 may comprise a different material from the component(s) on which it is/they are provided, or vice-versa. As seen in FIG. 2 when the projection 720 is received in the groove 710, a portion of the projection 720 extends into the groove 710. The groove 710 may extend further circumferentially around the rotational axis 400 than this portion of the projection 720. For example, the groove 710 may extend up to 50 degrees further around the rotational axis 400 than the projection 720.

According to embodiments of the present disclosure, arrangement of the groove 710 and the projection 720 may be such that placing the coupling 300 into at least one of the first or second rotational positions does not cause the circumferential extremities 711, 712 of the groove 710 to be contacted. In this way, it may be possible to prevent possible deformation of the groove 710 and/or projection 720 that could lead to jamming or inadvertent disengagement of the axial translation limit 700. As a non-limiting example, such an arrangement may be achieved by providing the first and second rotational positions so as to define an angle, with a vertex on the rotational axis 400, which is smaller than a central angle of an arc about the rotational axis 400 along which the groove 710 is arranged.

As seen in FIG. 1, the axial centering system 800 may comprise a hole 810. The hole 810 may substantially cylindrical in shape. The axial centering system 800 may comprise a shaft 820. The shaft 820 may be substantially cylindrical in shape.

As seen in FIG. 2, the hole 810 may be configured to receive the shaft 820, such that the hole 810 and the shaft 820 are both substantially coaxial to the rotational axis 400. The shaft 820 may be rotatable in the hole 810, about the rotational axis 400, when received therein.

Movement of the first 100 and second 200 components along or about axes perpendicular to the rotational axis 400 may depend on clearances between the hole 810 and the shaft 820. As a non-limiting example, a sliding clearance may be provided between the hole 810 and the shaft 820. As a non-limiting example, the clearances may be 0.05 mm.

As seen in FIG. 1, the hole 810 may be provided on the first component 100. The shaft 820 may be provided on the second component 200.

The hole 810 and shaft 820 may even be provided on the first 100 and second 200 components respectively, or vice versa.

The hole 810 and/or the shaft 820 may be monolithically formed on the component(s) on which they are/it is provided. For example, the hole 810 may be monolithically formed on the first component 100 when it is provided thereon, and/or the shaft 820 may be monolithically formed on the second component 200 when it is provided thereon, or vice versa.

The hole 810 and/or the shaft 820 may be made of a same material as the component(s) on which it is/they are provided. In this way, it may be possible to form the hole 810 and/or the recess 820 substantially simultaneously with the component(s) on which it is/they are provided. Additionally or alternatively, when the hole 810 and/or the shaft 820 is/are monolithically formed with the component(s) 100, 200 on which it is/they are provided, provision of the same material may facilitate monolithic formation.

Alternatively, the hole 810 and/or the shaft 820 may comprise a different material from the component (s) on which it is/they are provided.

The biasing force provided by the protrusion 320 may be inversely dependent on a length of the protrusion 320. The length of the protrusion may be measured from a first extremity of the protrusion 320, which is configured to be inserted into the recess 310, to second extremity of the protrusion 320, which is opposite the first extremity.

Extension of the protrusion 320 in a direction perpendicular to the rotational axis 400 may allow the long protrusion 320 to be long without requiring a lengthening of the overall coupling 300. As such, it may be possible to reduce the biasing force without lengthening the overall coupling 300.

As seen in FIG. 1, the first component 100 may comprise an orifice, with the recess 310 being presented on an interior peripheral surface of the orifice, and the second component may comprise an axle, with the protrusion 320 being presented to protrude beyond an exterior peripheral surface of the axle. As seen in FIG. 4B, the second extremity of the protrusion 320 may be located on an opposite side of the rotational axis 400 from the first extremity of the protrusion 320. As the protrusion 320 bends, a distance between the recess 310 and the second extremity of the protrusion 320 may decrease. Additionally or alternatively, this arrangement may allow for much of the length of the protrusion 320 to be concealed within the axle. This may reduce the need to increase the girth of the coupling 300 to accommodate a longer protrusion 320. As a non-limiting example, as much as 0-90% of the length of the protrusion 320 may be concealed within the axle.

As seen in FIG. 1, the female part 610 may be provided in the orifice and the male part 620 on the axle. For example, the female part 610 may be provided at an axial extremity of the orifice, and the male part 620 at a corresponding axial extremity of the axle.

Alternatively, the female part 610 may be provided in one or more axial and/or peripheral surfaces of the axle, and the male part 610 arranged to extend from one or more corresponding axial and/or peripheral surfaces of the orifice. As a non-limiting example, the male part 620 may protrude from an axial surface of the orifice, and the female part 620 may be recessed in a corresponding axial surface of the axle.

As seen in FIG. 1, when the groove 710 and projection 720 are present, the groove 710 may be provided on a peripheral surface in the orifice, and the projection 720 on a peripheral surface of the axle, or vice versa. The groove 710 or projection 720 may be provided near an open extremity of the orifice, so that interference of the projection 720 with the peripheral surface in which the groove 710 is provided may be limited during assembly of the coupling 300.

As seen in FIG. 1, when the hole 810 and shaft 820 are present, the hole 810 may be provided in the orifice and the shaft 820 on the axle, or vice versa. For example, the hole 810 may be provided as a substantially cylindrical peripheral surface in the orifice, and the shaft 820 may be provided as a substantially cylindrical peripheral surface of the axle. Alternatively, the shaft 820 may be provided to extend from the axial surface of the orifice, and the hole may be provided in the corresponding axial surface of the axle.

As seen in FIG. 1, the rotation limit 600 may be provided on the axial surface of the orifice, and the corresponding extremity of the axle. The protrusion 320 may be positioned along the axle such that it resides in the recess 310 at a position along the rotational axis 400 that is intermediate the rotation limit 600 and the open axial extremity of the orifice. When present, the axial translation limit 700 may be provided near the open axial extremity of the orifice, and the corresponding extremity of the axle.

When present, the axial centering system 800 may be provided at a position along the rotational axis 400 that is intermediate the axial surface of the orifice and the open axial extremity of the orifice. As seen in FIG. 1, the shaft 820 may be provided between the protrusion 320 and the rotation limit 600. Additionally or alternatively, the shaft 820 may be provided between the protrusion 320 and the open axial extremity of the orifice. For example, as seen in FIG. 1, the axial centering system 800 comprises shafts 820 on either side of the protrusion 320.

It may be understood in the foregoing disclosure that structures of the coupling 300 which are not monolithically formed with one another may potentially be provided as independent pieces in cooperation with one another.

As seen in FIG. 1, the coupling may consist of the first component 100 and the second component 200. In this case, the female 610 and male 620 parts of the rotation limit 600 are respectively monolithically formed with the first 100 and second 200 components, or vice versa. Similarly, and without regard for which parts 610, 620 of the rotation limit 600 are monolithically formed with which components 100, 200 of the coupling, when the groove 710 and projection 720 of the axial translation limit 700 are present, they are respectively monolithically formed with the first 100 and second 200 components, or vice versa. Similarly, and independently of the presence of the axial translation limit 700 in the coupling, when the hole 810 and the shaft 820 of the axial centering system 800 are present, they are respectively monolithically formed with the first 100 and second 200 components, or vice versa.

The present disclosure also presents a method of assembling a coupling. The coupling may be a coupling 300 as described herein.

The method may comprise axially aligning a first component 100 and a second component 200 of the coupling 300 so as to be substantially coaxial to a rotational axis 400 of the coupling 300.

The method may comprise rotationally aligning a protrusion 320 on the first component 100 with a recess 310 on the second component 200.

The method may comprise rotationally aligning a male part 620 of a rotation limit 600 of the coupling 300 with a female part 610 of the rotation limit 600. Rotationally aligning the male 620 and female 610 parts of the rotation limit 600 may occur concurrently or non-concurrently with rotationally aligning the protrusion 320 and recess 310. Concurrent rotational alignment may be suitable for provision of a coupling 300 with a neutral rotational position that is intermediate the first and second rotational positions.

The method may comprise translationally aligning the first component 100 and the second component 200 so that the protrusion 320 is inserted into the recess 310.

The method may comprise translationally aligning the male part 620 and female part 610 so that the male part 620 is inserted into the female part 610 and extends into the female part 610 along the rotational axis 400. Translationally aligning the male 620 and female 610 parts may occur concurrently or non-concurrently with translationally aligning the components for insertion of the protrusion 320 into the recess 310. Concurrent translational alignment may allow for a distance along the rotational axis 400 between the rotation limit 600 and the protrusion 320 to be reduced. Non-concurrent translational alignment may help to isolate the protrusion 320 and the rotation limit 600 from one another.

The method may comprise inserting a radial projection 720 of an axial translation limit 700 of the coupling 300 into a circumferential groove 710 of the axial translation limit 700. Insertion of the projection 720 into the groove 710 may occur concurrently or non-concurrently with translationally aligning the male part 620 and the female part 610. Concurrent insertion and translational alignment may allow for a distance along the rotational axis 400 between the rotation limit 600 and the axial translation limit 700 to be reduced. Non-concurrent insertion and translational alignment may help to isolate the rotation limit 600 and the axial translation limit 700 from one another.

Additionally or alternatively, insertion of the projection 720 into the groove 710 may occur concurrently or non-concurrently with translationally aligning the components for insertion of the protrusion 320 into the recess 310. Concurrent insertion and translational alignment may allow for a distance along the rotational axis 400 between the protrusion 320 and the axial translation limit 700 to be reduced. Non-concurrent insertion and translational alignment may help to isolate the protrusion 320 and the axial translation limit 700 from one another.

The method may comprise inserting a shaft 820 of an axial centering system 800 of the coupling 300 into a hole 810 of the axial centering system 800. Insertion of the shaft 820 into the hole 810 may occur concurrently or non-concurrently with translationally aligning the male part 620 and the female part 610. Concurrent insertion and translational alignment may allow for a distance along the rotational axis 400 between the rotation limit 600 and the axial centering system 800 to be reduced. Non-concurrent insertion and translational alignment may help to isolate the rotation limit 600 and the axial centering system 800 from one another.

Additionally or alternatively, insertion of the shaft 820 into the hole 810 may occur concurrently or non-concurrently with translational alignment of the components for insertion of the protrusion 320 into the recess 310. Concurrent insertion and translational alignment may allow for a distance along the rotational axis 400 between the protrusion 320 and the axial centering system 800. Non-concurrent insertion and translational alignment may help to isolate the protrusion 320 and the axial centering system 800 from one another.

Additionally or alternatively, when the groove 710 and projection 720 are present, insertion of the shaft 820 into the hole 810 may occur concurrently or non-concurrently with insertion of the groove 710 into the projection 720. Concurrent insertion may allow for a distance along the rotational axis 400 between the protrusion the axial centering system 800 and axial translation limit 700 to be reduced. Non-concurrent insertion may help to isolate the axial centering system 800 and the axial translation limit 700 from one another.

Molding (such as injection molding or similar) and/or additive manufacturing (including, for example the processes described below) may be suitable for fabrication of the first 100 and/or second 200 component(s). The first 100 and/or second 200 component(s) may be fabricated simultaneously with one or more items monolithically formed therewith, such as: the recess 310 (in the case of the first component 100), the protrusion 320 (in the case of the second component 200), the female 610 or the male 620 part, the groove 710 or projection 720 (when present), the hole 810 or shaft 820 (when present).

Alternatively, one or more of these items may be fabricated sequentially with the component on which it is monolithically formed, such as through an overmolding process or by adhering the item to the component.

An additive manufacturing process may be chosen among material extrusion (e.g. fused deposition modeling/fused filament fabrication and the like) which uses thermoplastic filaments (e.g. ABS, PLA, nylon, PETG), or powder bed fusion (e.g. including selective laser sintering, selective laser melting, electron beam melting and the like) which uses thermoplastic powders (e.g. polyamide 12, polyamide 11), or material jetting (e.g. polyjet and multi-jet printing and the like) which uses thermoset photopolymer resins (e.g. standard, ABS-like, PP-like, rubber-like, high temperature) or VAT photopolymerization (e.g. stereolithography, direct light printing, continuous liquid interface production/continuous liquid interphase printing and the like) which uses thermoset liquid resins (e.g. standard, ABS-like, PP-like, rubber-like, high temperature).

For example, computed axial lithography and similar techniques, formation stimuli are provided to a raw material from multiple orientations about the fabrication axis, causing the raw material to transform into solid material about the fabrication axis.

Aligning the fabrication axis and the rotational axis 400 may mitigate limitations of additive manufacturing techniques.

As seen in FIGS. 6A-6B & 7A-7B, a handle may be provided. The handle may be for a handheld device.

The handle may comprise a connection portion 1000. The connection portion may be provided at a first side of the handle.

The connection portion 1000 may extend longitudinally to the first side. For example, the connection portion along a linear contour that is parallel or coaxial with the rotational axis 400, or along a curvilinear contour that is tangential to the rotational axis 400.

The handle may comprise a grip portion 2000. The grip portion may be provided at a second side of the handle.

The grip portion may extend longitudinally to the second side. For example, the grip portion may extend longitudinally along a linear contour that is parallel or coaxial with the rotational axis 400 of the coupling 300, or along a curvilinear contour that is tangential to the rotational axis 400.

The grip portion 2000 may be connectable to an arm, such as by way of a hand holding the grip portion 2000. The grip portion 2000 may be adapted to be gripped by a hand, more specifically an animal hand, such as a human hand or a prosthesis thereof.

The handle may comprise a coupling 300. The coupling 300 may be a coupling 300 as described herein.

The coupling 300 may be configured to couple the connection 1000 and grip 2000 portions together such that the rotational axis 400 of the coupling 300 extends between the first and second sides of the handle.

The coupling 300 allows the connection portion 1000 to rotate relative to the grip portion 2000 about an axis extending between the first and second sides of the handle. Because the coupling 300 is simple in construction, and may be slender and prismatic/cylindrical in exterior geometry, it may be unnecessary to increase girth of the handle in a vicinity of the coupling 300 in order to provide this rotatability.

Figure 7A:
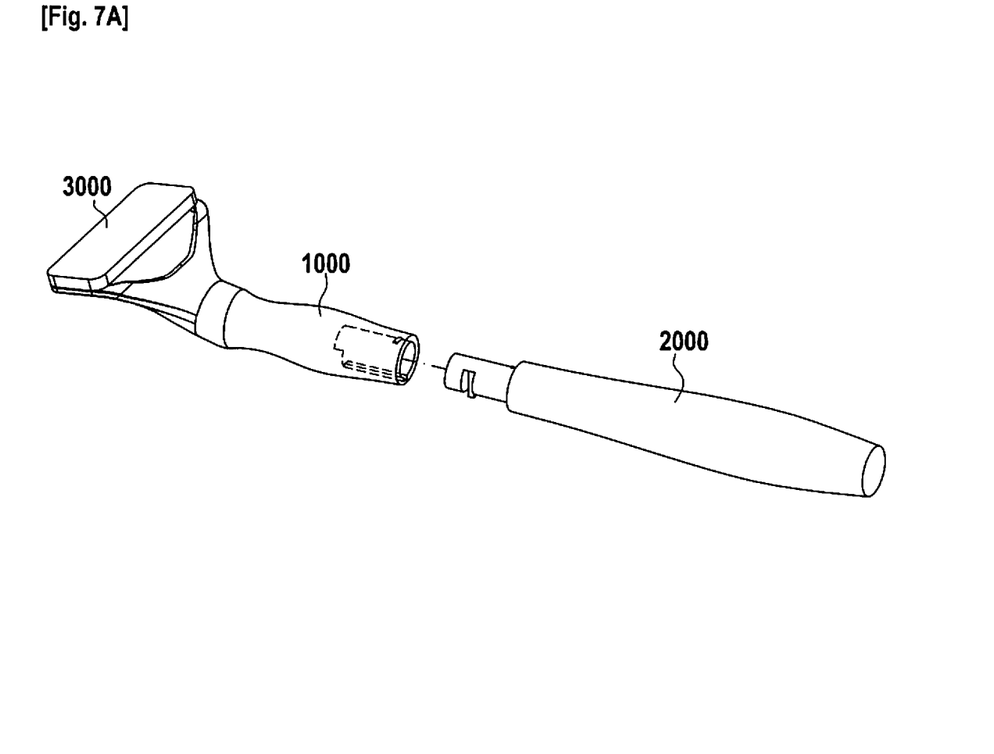
FIG. 7A shows a disassembled handle in perspective.
Figure 7B:
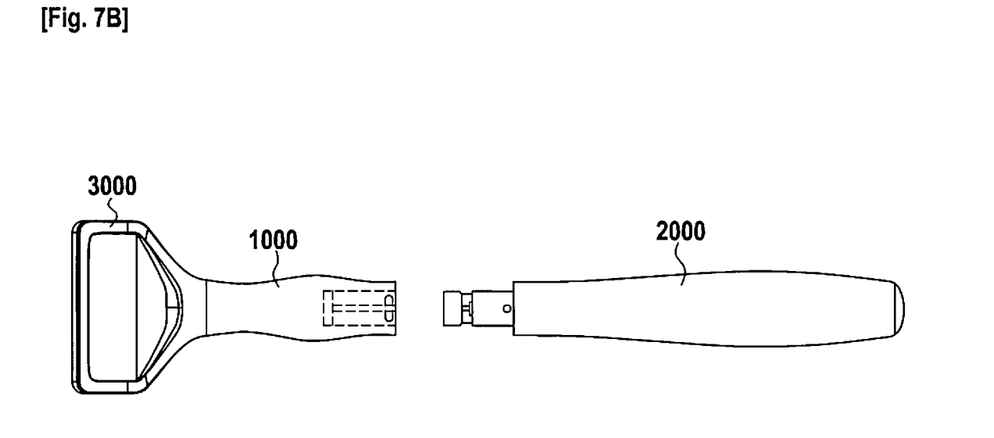
FIG. 7B shows a disassembled handle from a top view.

According to embodiments of the present disclosure, the handle may, as seen in FIGS. 7A & 7B, consist of the connection portion and the grip portion. In such a configuration the connection 1000 and grip 2000 portions may respectively be monolithically formed with to the first 100 and second 200 components of the coupling, or vice-versa.

The connection portion 1000 may be configured to attach to a tool.

The handle may allow rotation of the tool relative to a hand holding the handle at the grip portion 2000 thereof with a substantially constant grip thereon.

As a non-limiting example, the connection portion 1000 may comprise an interface 1001 for detachably connecting to the tool, as seen in FIG. 6B. In this case, the interface 1001 may substantially prevent rotation of the tool about the rotational axis 400 with respect to the connection portion 1000 to which it is connected.

The tool may include a skincare head 3000. The tool may even be a skincare head.

For example, as seen in FIG. 6A-6B, a razor may be provided.

The razor may comprise a skincare head. The skincare head include a shaver head. The skincare head may even be a shaver head.

The razor may comprise a coupling 300 as described herein. The razor may allow rotation of the blade(s) of the shaver head within a given range relative to a hand holding the razor with a substantially constant grip thereon. The rotation may occur about the rotational axis 400 of the coupling 300.

The razor may even comprise a handle as described herein. The blade(s) may thus be rotatable around an axis extending between the first and second sides of the handle.

When shaving or pressing the skincare tool on the contours of the skin, the normal contact forces may change the orientation of the tool (and the connection portion 1000 of the handle) to follow the contours. This may cause the rotation of the connection portion 1000 relative to the grip portion 2000. During such rotation, the protrusion 320 may bend. While bending, the protrusion may remain in the recess 310 in which it is received. Reaction forces generated during the bending deformation of the protrusion may oppose the rotation, and may restore the protrusion (and therefore the handle) to the neutral position when normal forces are no longer applied to the skincare tool.

Although the described embodiments were provided as different exemplary embodiments, it is envisioned that these embodiments are combinable or, when not conflicting, the features recited in the described embodiments may be interchangeable. Moreover, the features recited in the described embodiments are not inextricably linked to one another, unless such a linkage is clearly indicated between two given features.

Throughout the description, including the claims, the term "comprising a" should be understood as being synonymous with "comprising at least one" unless otherwise stated. In addition, any range set forth in the description, including the claims should be understood as including its end value(s) unless otherwise stated. Specific values for described elements should be understood to be within accepted manufacturing or industry tolerances known to one of skill in the art, and any use of the terms "substantially" and/or "approximately" and/or "generally" should be understood to mean falling within such accepted tolerances.

Although the present disclosure herein has been described with reference to particular embodiments, it is to be understood that these embodiments are merely illustrative of the principles and applications of the present disclosure.

It is intended that the specification and examples be considered as exemplary only, with a true scope of the disclosure being indicated by the following claims.

The invention claimed is:

1. A coupling for a razor, comprising a first component and a second component rotatable relative thereto about a rotational axis extending therebetween, the second component comprising a resilient protrusion, the first component comprising a recess in which the protrusion is receivable, the recess being configured to elastically bend the protrusion received therein in response to a force applied during shaving, thereby rotating one of the first component and the second component about the rotational axis relative to the other, the coupling further comprising a rotation limit that comprises a male part extending along the rotational axis into a female part, the male and female parts being shaped to define one or more rotational stops to the rotation of the one of the first component and the second component about the rotational axis relative to the other, and the protrusion being configured to bias the first or second components towards a neutral position once the force applied is stopped, wherein the protrusion is monolithically formed with the second component.

2. The coupling of claim 1, wherein the protrusion extends in a direction perpendicular to the rotational axis.

3. The coupling of claim 1, wherein the recess is monolithically formed on the first component.

4. The coupling of claim 1, wherein a first rotational stop is defined by a first surface portion of the female part that is configured to contact a first surface portion of the male part received in the female part when the coupling reaches a first rotational position.

5. The coupling of any of claim 1, wherein a cross-section of the male part, taken perpendicularly to the rotational axis, comprises a first circular arc with a first central angle, a cross-section of the female part, taken perpendicular to the rotational axis, comprises a second circular arc, substantially concentric to the first circular arc, with a second central angle that is greater than first central angle.

6. The coupling of claim 1, comprising an axial translation limit configured to limit translation of the first component relative to the second component along the rotational axis.

7. The coupling of claim 6, wherein a radial projection of the axial translation limit is slidingly receivable within a circumferential groove of the axial translation limit.

8. The coupling of claim 7, wherein one of the circumferential groove and the radial projection is monolithically formed with the first component and the other is monolithically formed with the second component.

9. The coupling of claim 1, wherein a substantially cylindrical shaft of an axial centering system is monolithically formed with the second component, and a substantially cylindrical hole of the axial centering system is monolithically formed with the first component, wherein the shaft is receivable within the hole and rotatable in the hole about the rotational axis, and the hole, and the shaft received in the hole, are both substantially coaxial with the rotational axis.

10. A method of assembling a coupling according to claim 1, the method comprising axially aligning the first component and the second component of the coupling so as to be substantially coaxial to the rotational axis, rotationally aligning the resilient protrusion on the second component with the recess of the first component, translationally aligning the first component and the second component so that the protrusion is inserted into the recess, rotationally aligning the male part of the rotation limit of the coupling with the female part of the rotation limit, and translationally aligning the male female parts so that the male part is inserted into the female part and extends into the female part along the rotational axis.

11. The method of claim 10, further comprising one or more of the following:
inserting a radial projection of an axial translation limit of the coupling into a circumferential groove of the axial translation limit;
inserting a shaft of an axial centering system of the coupling into a hole of the axial centering system.

* * * * *

UNITED STATES PATENT AND TRADEMARK OFFICE
CERTIFICATE OF CORRECTION

PATENT NO. : 12,134,202 B2
APPLICATION NO. : 17/428826
DATED : November 5, 2024
INVENTOR(S) : Argyro Kallivretaki and Ioannis Bozikis It is certified that error appears in the above-identified patent and that said Letters Patent is hereby corrected as shown below:

In the Claims

In Claim 5, Column 16, Line 13, after "coupling" delete "of any".

Page 1 of 1

Signed and Sealed this
Seventeenth Day of December, 2024

Derrick Brent
*Acting Director of the United States Patent and Trademark Office*